Nov. 30, 1943.  H. KNOOP  2,335,423
MACHINE FOR MAKING HELICALLY WOUND BARREL-SHAPED SPRINGS
Filed June 28, 1941
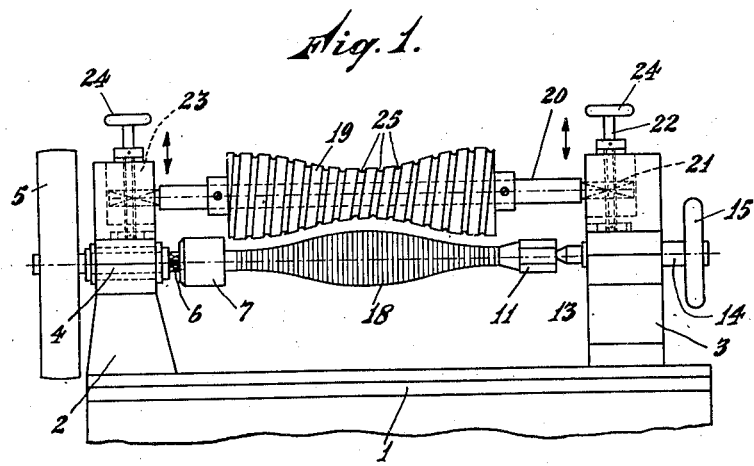
Inventor
Hendrikus Knoop
by Moses & Nolte
His Attorneys Patented Nov. 30, 1943

2,335,423

UNITED STATES PATENT OFFICE 2,335,423

MACHINE FOR MAKING HELICALLY WOUND BARREL-SHAPED SPRINGS

Hendrikus Knoop, Utrecht, Netherlands; vested in the Alien Property Custodian

Application June 28, 1941, Serial No. 400,274
In the Netherlands December 15, 1939

2 Claims. (Cl. 140—78)

The invention relates to a machine for the manufacture of helically wound springs, in particular springs being narrower at the ends than intermediately, e. g. double conical springs, comprising a rotary core gauge and a device for determining the pitch of winding of the spring on the gauge, such springs being commonly denominated barrel-shaped springs.

The invention has for its object to considerably simplify a machine of this kind and thereby to make it much cheaper than the hitherto known machines.

The invention is partially based upon the concept that if it were possible, after having helically wound an originally straight spring-metal wire on a core of the required, e. g. double-conical, shape, to remove said core from the spring in a simple manner, a practical machine for the manufacture of these springs could be built, doubtless to be preferred over the known, expensive and complicated machines.

According to the invention the core gauge comprises an axially removable spindle carrying a core body composed of a series of adjacent annular disc shaped pieces or slices together having an external shape corresponding to the internal shape to be given to the spring to be made by helically winding a spring wire and having a thickness smaller than the spacing of the windings of the helical spring to be made on this core gauge in its original or in a stretched shape. By reason of the fact that the spindle is removable in axial direction the pieces of the core gauge will fall down through between adjacent windings upon removal of the spindle.

In connection with the relation existing between the pitch of the helical spring and the thickness of said annular disc shaped pieces the invention includes a pitch control means ensuring that on the core body a spring will be wound with the required pitch. Preferably said device is a counter-gauge to the core gauge, e. g. a diabolo or spool-shaped member for a double-conical core gauge. This member may be rotatably mounted with its axis parallel to the axis of the spindle and it is further preferably adjustable towards and away from the core gauge and adapted to be locked in position. Preferably this member is also interchangeable with a view to helical springs of different shape. The adjustability towards the core and away therefrom is desirable with a view to springs of different thickness of the spring wire and with a view to the insertion of the spring wire to be wound and the detensioning or partial recoiling of the spring after having been helically wound.

By a suitable choice of the thickness and the external diameter of the annular disc-shaped pieces, constituting the core body or gauge, in connection with the shape of the helical spring to be made and the use of a corresponding pitch control means it is possible to make on the machine helical springs of various shapes. Cylindrical helical springs may, if desired, also be made thereon although in this case the composition of the core body of annular disc-shaped pieces is not strictly necessary. The machine is particularly adapted for the manufacture of the double-conical or otherwise shaped helical springs in which there are relatively wide windings between narrow end-windings.

Further features of the invention will be explained more fully hereinafter.

The drawing illustrates by way of example a machine according to the invention for the manufacture of double-conical helical springs.

Figure 1 is a side elevation of this machine.

Figure 2 is, on a larger scale, an elevation of a core gauge adapted for use in this machine.

Figure 3 is an elevation of a double-conical helical spring to be made by means of said machine, this elevation being also on a larger scale than Figure 1.

The machine according to Figure 1 has a base 1 to which bearing-pedestals 2 and 3 are secured. A short shaft 4 is freely rotatably but axially non-slidably supported by the pedestal 2. The shaft 4 carries a belt pulley 5. At the end of the shaft 4 remote from said pulley the shaft by means of a clamping cone 6 engages a corresponding recess of a head 7 of a core spindle 8 the other end 9 (Fig. 2) of which is provided with internal screw thread for a screw 10 having a hexagon 11 provided with a center hole 12 (Fig. 2).

A center 13 supported in said hole is adapted to be clamped in position by means of a screw 14 and hand-wheel 15, said screw being supported by the pedestal 3. The adjusted position of the screw and center may be fixed by means of a non-illustrated toggle-device or the like located at the rear side of the pedestal 3. The core-spindle 8 may thus be rotated by means of the belt pulley 5. The spindle 8 carries a series of annular discs 15 adapted to be clamped together between a collar 16 of the head 7 and a collar 17 of the hexagon 11. Together they constitute a core body or core gauge having the shape appearing from Figure 2.

In Figure 1 this core gauge is as a whole denoted by 18. Above this gauge a pitch control means is located constructed as a counter gauge 19 rotatably but non-slidably mounted on a horizontal spindle 20 the axis of which is parallel to that of the horizontal core-spindle 8. The spindle 20 is at its ends provided with squares 21 each carried by a screw 22 in a vertical guiding slot 23 of the pedestals 2 and 3 respectively. The screws 22 may be screwed upwards or downwards by means of hand-wheels 24 so as to adjust the counter gauge 19 towards the core-gauge 18 or away therefrom. The counter-gauge 19 corresponds in shape to the double-conical core-gauge 18 and in this instance is diabolo-shaped. Within the core-body 19 a helically wound groove 25 is made the width of which corresponds to the thickness of the spring wire to be wound and the pitch of which corresponds to that with which the spring wire is to be helically wound on the core gauge 18. The head 7 at the side of the core gauge is provided with a pair of axial bores 26 and 27 of different diameter for the insertion of a spring wire end of corresponding diameter and bent at right angles. There might also be more than two bores.

The machine operates as follows:

A straight spring wire is with its bent end inserted e. g. in the bore 26 of the head 7. The wire will then be located between the core gauge 18 and the counter gauge 19 which in its vertical guides 23 has been somewhat lifted. Now, the counter gauge 19 is lowered until the spring wire will rest in the first winding groove of said gauge. This gauge is then left in this final position. Then the core gauge 18 is rotated by means of the belt pulley 5 and the spring wire is thereby helically wound on the core gauge between the two gauges. The groove 25 determines the pitch of the windings. As soon as the spring wire has been wound on the core gauge 18 for a sufficient length the drive of the belt pulley 5 is stopped. The counter gauge is then screwed upwards and the helical spring will be somewhat detensioned, however, still remaining on the core gauge 18. Now, by means of the hand wheel 15 the center 13 is screwed axially to the right in Figure 1 whereafter the core gauge and the head 7, the hexagon 11 and the spring are removed from the machine. Then the hexagon 11 is screwed off and the spindle 8 may be withdrawn from the spring. The pieces or annular discs 15 will now subsequently fall down between the spring windings. Care has of course been taken to use discs 15 of corresponding thickness, that is to say having a thickness smaller than the spacing of the helical windings of the springs in finished condition. A finished spring is denoted by 28 in Figure 3.

It will be clear that by the use of annular discs of different thickness and external diameter helical springs of various shapes may be made in the machine. Correspondingly shaped and grooved counter-gauges will of course be necessary, which to this end may be adapted to be removed axially from the shaft or may be made interchangeable otherwise.

Further double-conical springs may be made in the machine, which in longitudinal section are concave or convex; also springs of other shape may be made in the machine.

In order to remove the core gauge from the machine, the pedestal 3 might e. g. be slidable over the base 1 in the longitudinal direction of the spindle 8.

I claim:

1. A machine for the manufacture of helically wound springs, in particular springs that are narrower at the ends than intermediately characterized by a rotary and removable spindle carrying a core gauge composed of a series of pieces located adjacent one another and shaped as annular discs together having an external shape corresponding to the internal shape to be given to a spring to be wound on said gauge and comprising a pitch determining means consisting in a counter gauge the axis of which is parallel to that of the spindle, said counter gauge being adjustable towards and away from the core gauge and being provided with a helically wound groove in its surface.

2. A machine for the manufacture of helically wound springs, in particular springs that are narrower at the ends than intermediately characterized by a rotary and removable spindle at one end having a head adapted to be driven and at the other end having a head adapted to be screwed in and out, said spindle carrying a core gauge composed of a series of pieces located adjacent one another and shaped as annular discs together having an external shape corresponding to the internal shape to be given to a spring to be wound on said gauge and comprising a pitch determining means consisting in a counter gauge the axis of which is parallel to that of the spindle, said counter gauge being adjustable towards and away from the core gauge and being provided with a helically wound groove in its surface.

HENDRIKUS KNOOP.